US010848626B2

(12) United States Patent
Honda et al.

(10) Patent No.: US 10,848,626 B2
(45) Date of Patent: Nov. 24, 2020

(54) IMAGE READING APPARATUS AND DIRT DETECTION METHOD

(71) Applicant: SEIKO EPSON CORPORATION, Tokyo (JP)

(72) Inventors: Daisuke Honda, Fukuoka (JP); Kohei Arai, Fukuoka (JP); Masahiko Mizoguchi, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/581,839

(22) Filed: Sep. 25, 2019

(65) Prior Publication Data

US 2020/0106892 A1 Apr. 2, 2020

(30) Foreign Application Priority Data

Sep. 27, 2018 (JP) .................................. 2018-181374

(51) Int. Cl.
*H04N 1/409* (2006.01)
*H04N 1/00* (2006.01)

(52) U.S. Cl.
CPC ..... *H04N 1/00092* (2013.01); *H04N 1/00037* (2013.01); *H04N 1/00063* (2013.01)

(58) Field of Classification Search
CPC ........... H04N 1/00092; H04N 1/00037; H04N 1/00063

USPC ................................ 358/1.9, 3.26, 1.13, 504
See application file for complete search history.

(56) References Cited

U.S. PATENT DOCUMENTS 6,937,361 B1 * 8/2005 Kondo ................. H04N 1/4097
358/1.9

FOREIGN PATENT DOCUMENTS

JP            2012-249268 A     12/2012

* cited by examiner

*Primary Examiner* — Jamares Q Washington
(74) *Attorney, Agent, or Firm* — Global IP Counselors, LLP

(57) ABSTRACT

An image reading apparatus includes a reading section that receives light input via a transparent member to perform reading, a background section configured to switch a background facing the transparent member either to a first background that is a background of a first color or to a second background that is a background of a second color brighter than the first color, and a control section. The control section compares, with a threshold set in advance, first read data generated by causing the reading section to perform reading of the first background, compares, with the threshold, second read data generated by causing the reading section to perform reading of the second background, and, when the first read data is above the threshold or when the second read data is below the threshold, determines that dirt is present on the transparent member.

8 Claims, 8 Drawing Sheets

IMAGE READING APPARATUS AND DIRT DETECTION METHOD

The present application is based on, and claims priority from JP Application Serial Number 2018-181374, filed Sep. 27, 2018, the disclosure of which is hereby incorporated by reference herein in its entirety.

BACKGROUND

1. Technical Field

The present disclosure relates to an image reading apparatus and a method for detecting dirt in the image reading apparatus.

2. Related Art

An image forming apparatus is disclosed in which an original reading section that performs reading via a transparent member provided in an image reading area is controlled so that the original reading section reads, as white image data, an image of a white section provided at a position facing the image reading area in plan view, and, based on the white image data, the position, shape, and density of a dirty area in the transparent member is detected (refer to JP-A-2012-249268).

However, in the configuration for detecting dirt based on white image data obtained by reading performed by the white section as described in JP-A-2012-249268, when debris whose density is at the same level as the density of the white section is adhered onto the transparent member, there are some cases where the density corresponding to the debris is unable to be identified in the white image data and therefore dirt on the transparent member is unable to be appropriately detected.

SUMMARY

An image reading apparatus includes a reading section that receives light input via a transparent member to perform reading, a background section configured to switch a background facing the transparent member either to a first background that is a background of a first color or to a second background that is a background of a second color brighter than the first color, and a control section. The control section compares, with a threshold set in advance, first read data generated by causing the reading section to perform reading of the first background, compares, with the threshold, second read data generated by causing the reading section to perform reading of the second background, and, when the first read data is above the threshold or when the second read data is below the threshold, determines that dirt is present on the transparent member.

DESCRIPTION OF EXEMPLARY EMBODIMENTS

Hereinafter, embodiments of the present disclosure will be described with reference to the accompanying drawings. All the drawings are merely illustrative for purposes of explanation of the present embodiments. Since all the drawings are illustrative, the drawings may be inconsistent with each other and portions may be removed in each drawing.

1. Schematic Configuration of Image Reading Apparatus

Figure 1:
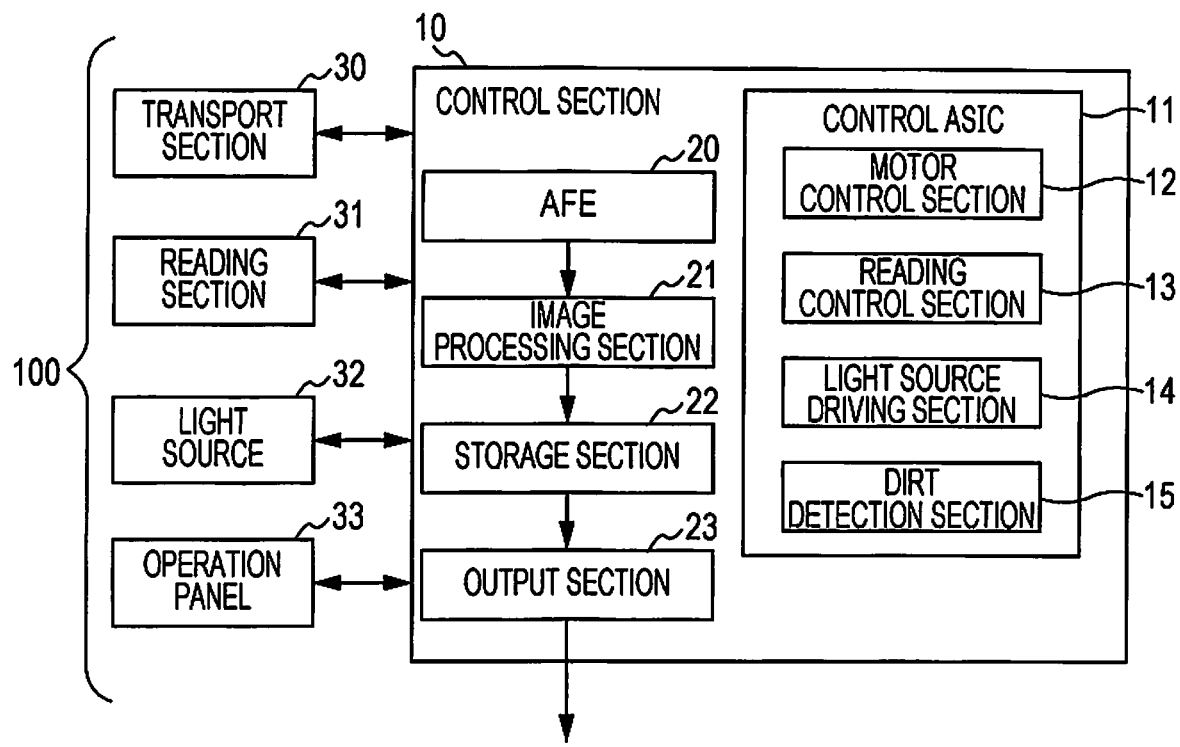
FIG. 1 is a block diagram simply illustrating a configuration of an image reading apparatus.

FIG. 1 simply illustrates the configuration of an image reading apparatus 100 according to the present embodiment.

Figure 2:
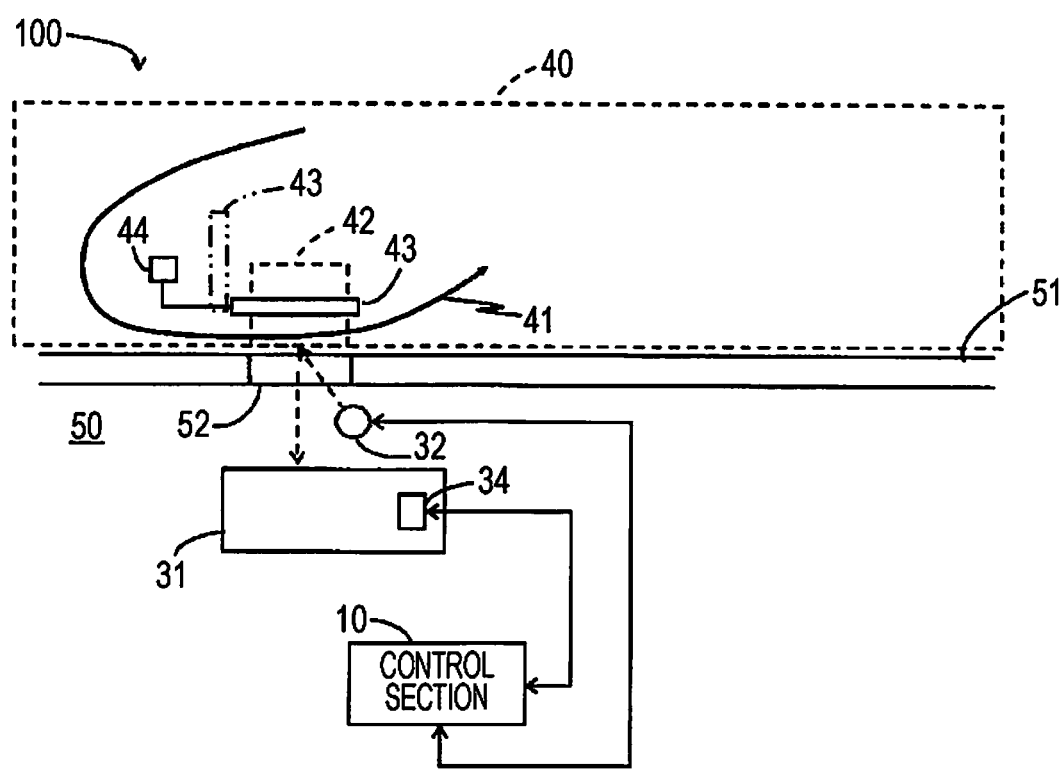
FIG. 2 is a diagram illustrating a partial configuration of an image reading apparatus including a background plate.

FIG. 2 is a diagram illustrating a partial configuration of the image reading apparatus 100 including a background plate 43.

The image reading apparatus 100 is a scanner capable of reading an original. The image reading apparatus 100 includes a transport section 30 that transports an original, a reading section 31 for performing reading, a light source 32 that illuminates an object to be read, such as an original, an operation panel 33, and a control section 10 that controls the transport section 30, the reading section 31, the light source 32, and the operation panel 33. The operation panel 33 includes a display section for displaying visual information, an operation receiving section for receiving an operation from a user, and the like. The operation receiving section is a touch panel implemented in the display section, physical buttons, and the like. The image reading apparatus 100 may be a multi-function product provided with, in addition to the function as a scanner, a plurality of functions of a printer and the like.

The transport section 30 is a mechanism for transporting an original from upstream toward downstream of transportation and, for example, includes a roller for transporting the original, a motor for rotating the roller, and the like. The original transported by the transport section 30 is read by the reading section 31. Accordingly, the image reading apparatus 100 corresponds to a sheet-feed scanner. The transport section 30 may be referred to as an auto document feeder (ADF).

The light source 32 is, for example, a light emitting diode (LED). The reading section 31 includes an image sensor 34. The image sensor 34 receives light that is emitted by the light source 32 and is then reflected from an original or the like, accumulates electric charges in accordance with the amount of received light, and sends the electric charges as image data to the control section 10. The image sensor 34 is made up of a plurality of sensor chips arranged in the main scanning direction. The main scanning direction is a direction intersecting the direction in which an original is transported by the transport section 30. The intersecting, as used here, means intersecting at right angles, which is not limited only to intersecting at right angles in the strict sense of the term but may also include some error that arises from, for example, actual inaccuracy in mounting parts. That is, the reading section 31 is a line sensor having a length capable of covering the width of an original in the main scanning direction. In FIG. 2, the main scanning direction is a direction perpendicular to the plane of FIG. 2.

Each sensor chip constituting the reading section 31 has a configuration similar to the configuration of a contact image sensor (CIS) or a charge coupled device (CCD) image sensor. That is, each sensor chip includes a photoelectric conversion element, a shift gate, and a shift register. The sensor chip opens the shift gate to transfer electric charges accumulated in the photoelectric conversion element and outputs the electric charges while sequentially moving the electric charges by using the shift register. The electric charges of each photoelectric conversion element correspond to the value of each pixel constituting image data (read data) read by a reading operation of the image sensor 34.

Opening the shift gate (transferring electric charges) is performed in response to control signals from a control application specific integrated circuit (control ASIC) 11 described later. The electric charges transferred to the shift register are converted into analog data and are transferred from an output section at the end of the shift register to an analog front end (AFE) 20 of the control section 10.

The control section 10 has a configuration including, for example, a central processing unit (CPU) that performs main control, a read-only memory (ROM) in which programs and the like are stored, a random access memory (RAM) that functions as a main memory to temporarily store data and the like, an ASIC designed for exclusively perform various types of processing, and other electronic circuit components. The control section 10 may be a controller integrated into a system on a chip (SoC). The control section 10 includes, for example, the control ASIC 11, the AFE 20, an image processing section 21, a storage section 22, and an output section 23. The control ASIC 11 includes a motor control section 12, a reading control section 13, a light source driving section 14, and a dirt detection section 15.

The motor control section 12, for example, controls a motor (not illustrated) included in the transport section 30 by performing proportional-integral-derivative (PID) control, thereby causing the transport section 30 to transport an original. The reading control section 13 controls reading performed by the reading section 31. Specifically, the reading control section 13 transmits to the reading section 31 a trigger as the control signal to control transfer of electric charges accumulated in the photoelectric conversion element to the shift register. The reading control section 13 also controls output of electric charges stored in the shift register of the reading section 31 to the AFE 20. The light source driving section 14 controls lighting of the light source 32 by controlling electric power supply to the light source 32. The light source driving section 14 is capable of controlling lighting of the light source 32 in response to a reading operation of the reading section 31.

The AFE 20 converts analog data output from the reading section 31 into digital data. The image processing section 21 applies various types of correction, such as shading correction, and given conversion to digital data output from the AFE 20 and outputs the result. The storage section 22 also functions as a buffer that temporarily stores digital data being processed or processed by the image processing section 21. The storage section 22 sends the temporarily stored digital data in a first in first out (FIFO) manner to the output section 23.

The output section 23 transmits digital data input from the storage section 22 to an external information processing device, for example, a host (not illustrated) such as a personal computer. The output section 23 is, for example, implemented by an interface for establishing network connection or universal serial bus (USB) connection. In addition, if the image reading apparatus 100 is a multi-function product as described above, the output section 23 may output data to a printer section, which is capable of performing printing based on image data, included in the image reading apparatus 100.

As described in FIG. 2, the image reading apparatus 100 includes a main body section 50 and a lid 40 that covers a given surface 51 of the main body section 50. The lid 40 may also be referred to as a cover. The lid 40 is openable and closable. Via a hinge section, a cable, or the like (not illustrated) for joining the main body section 50 and the lid 40 together, the configuration in the main body section 50 and the configuration in the lid 40 are electrically coupled together. In FIG. 2, the lid 40 is illustrated very simply by a broken line.

A portion of the given surface 51 is made of a transparent member 52, and the transparent member 52 is glass in many cases but may be a transparent material other than glass. Inside of the given surface 51, that is, within the main body section 50, as illustrated in FIG. 2, the light source 32, the reading section 31, the control section 10, and the like are contained. In the lid 40, the background plate 43 is disposed at a position facing the transparent member 52 in the state where the lid 40 is closed. The arrow in bold illustrated in the lid 40 is an example of a transport path 41 of an original. Although not illustrated in FIG. 2, the transport section 30 is mounted on the lid 40 and transports an original along the transport path 41. A tray for mounting originals before being read is disposed upstream of the transport path 41 and a tray for collecting originals after being read is disposed downstream of the transport path 41.

As illustrated in FIG. 2, the transport path 41 passes through the space between the transparent member 52 and the background plate 43. That is, when an original being transported along the transport path 41 passes through the position corresponding to the transparent member 52, the original is illuminated by the light source 32 and the reflected light from the original enters the reading section 31 through the transparent member 52. As known, the reading section 31 suitably includes an optical system including lenses, mirrors, and the like, and light that has entered the reading section 31 through the transparent member 52 is received by the image sensor 34 through this optical system.

In the state where there is no document in the space between the transparent member 52 and the background plate 43, the background plate 43 is illuminated by the light source 32. The background plate 43 is, for example, a gray plate. The background plate 43 is not consistently fixed to the position facing the transparent member 52 and may be evacuated from the position facing the transparent member 52, that is, the position illuminated by the light source 32. In FIG. 2, the background plate 43 that is evacuated from the position facing the transparent member 52 to be at an evacuation position is illustrated by a chain double-dashed line. The background plate 43 experiences motive power supplied from a motor 44 to move from the position facing the transparent member 52 to the evacuation position and move from the evacuation position to the position facing the transparent member 52. Control of driving of the motor 44 is performed by the control section 10.

When the background plate 43 is at the evacuation position, a partial space 42 within the lid 40 facing the transparent member 52 is illuminated by the light source 32.

In the state where the lid 40 is closed, the inside of the space 42 is dark, illuminated by little natural light. Although space is not considered an object, objects that substantially form the boundary of the space 42, that is, inner walls and a ceiling that define the space 42 within the lid 40 are collectively referred to as the space 42. The space 42 has a color darker than gray, and therefore the color of the space 42 may be said to be substantially black. Accordingly, in the state where the background plate 43 is at the evacuation position, the color of the background facing the transparent member 52 is black. In contrast, in the state where the background plate 43 is at a position facing the transparent member 52, the color of the background facing the transparent member 52 is gray.

Such a configuration including the background plate 43, the motor 44, and the space 42 corresponds to a background section configured to switch the background facing the transparent member 52 either to a first background, which is a background of a first color, or to a second background, which is a background of a second color brighter than the first color. The combination of the first color and the second color may be a combination in which the second color is a brighter color and is not limited to a combination of black and gray. For example, the first color may be gray and the second color may be white. However, by way of example, for the case where the first color is black and the second color is gray, description will be continued hereinbelow.

The image reading apparatus 100 is a sheet-feed scanner and may have a configuration available for a so-called flat-head mode. That is, on the given surface 51, a transparent member is fit to a position other than the position of the transparent member 52. In the flat-head mode, an original placed on the transparent member fit to the position other than the position of the transparent member 52 is read when some or all of the reading section 31 as well as the light source 32 move in a sub-scanning direction. The sub-scanning direction is a direction intersecting at right angles the main scanning direction and is the horizontal direction in FIG. 2. In the case where the image reading apparatus 100 is used as a sheet-feed scanner, that is, in a so-called ADF mode, some or all of the reading section 31 as well as the light source 32, which move in the sub-scanning direction in the flat-head mode, remain stationary at a position close to the transparent member 52 as illustrated in FIG. 2. Hereinbelow, unless otherwise stated, the image reading apparatus 100 employs the ADF mode.

2. Threshold Setting Process

Next, a threshold setting process will be described. The threshold set in the threshold setting process is a threshold for use in a dirt detection process described later.

Figure 3:
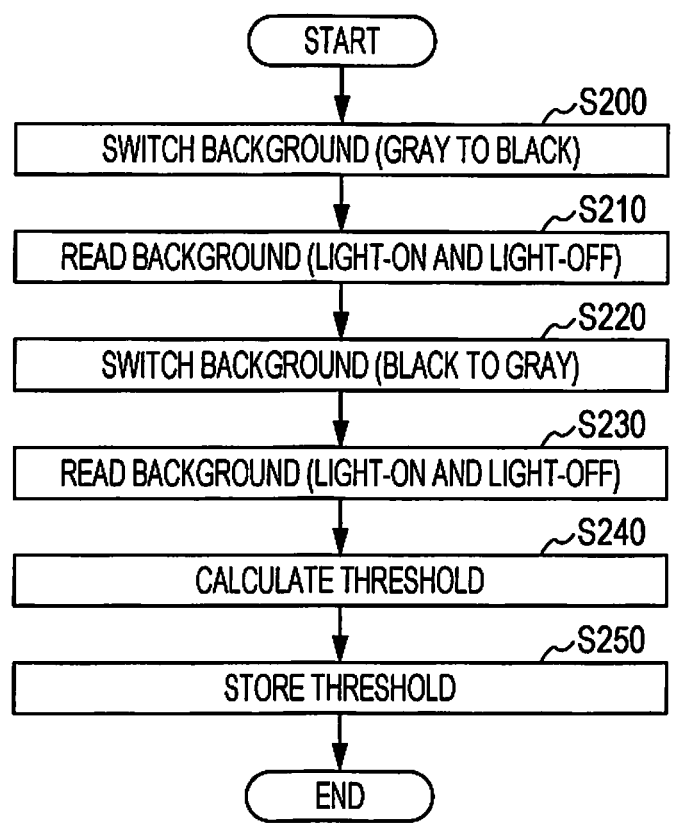
FIG. 3 is a flowchart illustrating a threshold setting process.

FIG. 3 illustrates, in a flowchart, a threshold setting process performed by the control section 10. The threshold setting process is performed, for example, as one of the processes performed by a vendor of the image reading apparatus 100 before the image reading apparatus 100 is shipped to the market. Alternatively, the threshold setting process is performed at a given timing at which a user uses the image reading apparatus 100, for example, at a timing at which a user presses a power supply button of the image reading apparatus 100 to activate the image reading apparatus 100.

In step S200, the control section 10 switches the background facing the transparent member 52 from the second background to the first background. That is, the control section 10 switches the background color of the transparent member 52 from gray to black. In this case, the control section 10 may control the driving of the motor 44 to move the background plate 43 from a position at which the background plate 43 faces the transparent member 52 to the evacuation position. However, when, at the time when the threshold setting process begins, the background plate 43 is already at the evacuation position, the control section 10 does not perform step S200 and the process proceeds to the next step S210.

In step S210, by controlling the light source 32 and the reading section 31, the control section 10 performs light-on reading of a background and light-off reading of the background. That is, the control section 10 causes the reading section 31 to read a first background in the state where the light source 32 is turned on, and further causes the reading section 31 to read the first background in the state where the light source 32 is turned off. In step S210 and step S230 described later, a background is read and therefore transportation of an original by the transport section 30 is not performed.

In step S220, the control section 10 switches the background facing the transparent member 52 from the first background to the second background. That is, the control section 10 switches the background color of the transparent member 52 from black to gray. In this case, the control section 10 may control driving of the motor 44 to move the background plate 43 from the evacuation position to a position facing the transparent member 52.

In step S230, like in step S210, by controlling the light source 32 and the reading section 31, the control section 10 performs light-on reading of a background and light-off reading of the background. That is, the control section 10 causes the reading section 31 to read the second background in the state where the light source 32 is turned on, and further causes the reading section 31 to read the second background in the state where the light source 32 is turned off.

In step S240, the control section 10 calculates a threshold based on read data obtained by background reading in step S210 and based on read data obtained by background reading in step S230.

Figure 4A:
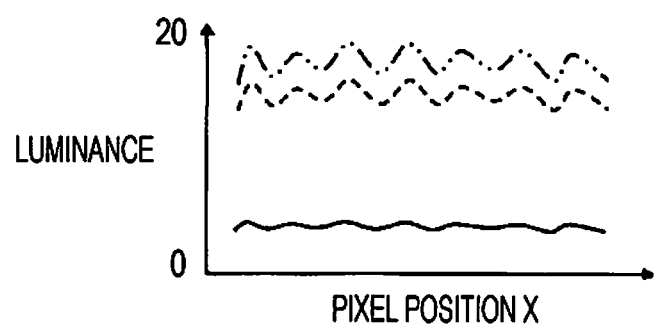
FIG. 4A is a diagram illustrating read data obtained by background reading.

FIG. 4A illustrates the read data obtained by background reading in step S210.

Figure 4B:
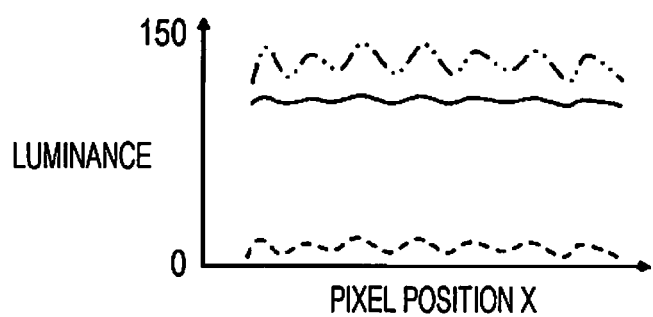
FIG. 4B is a diagram illustrating read data obtained by background reading.

FIG. 4B illustrates the read data obtained by background reading in step S230. Both in FIG. 4A and FIG. 4B, the horizontal axis represents the pixel position X and the vertical axis represents the luminance. The luminance is, for example, represented by a grayscale value in a range of 256 grayscale levels, from 0 to 255. The pixel position X is the position of each of pixels constituting read data and corresponds to the position of each of photoelectric conversion elements in the main scanning direction of the image sensor 34. In the drawings, the horizontal axis represents the pixel position X and the vertical axis represents the luminance. This is the same as in FIG. 5A, FIG. 5B, FIG. 7, and FIG. 8 referred to later.

The chain double-dashed line indicating the luminance at each pixel position X in FIG. 4A is read data obtained in step S210 by causing the reading section 31 to read a first background in the state where the light source 32 is turned on, and this read data is referred to as light-on black reference data. The broken line indicating the luminance at each pixel position X in FIG. 4A is read data obtained in step S210 by causing the reading section 31 to read the first background in the state where the light source 32 is turned off, and this read data is referred to as light-off black reference data.

The chain double-dashed line indicating the luminance at each pixel position X in FIG. 4B is read data obtained in step S230 by causing the reading section 31 to read the second background in the state where the light source 32 is turned on, and this read data is referred to as light-on gray reference data. The broken line indicating the luminance at each pixel position X in FIG. 4B is read data obtained in step S230 by causing the reading section 31 to read the second background in the state where the light source 32 is turned off, and this read data is referred to as light-off gray reference data. All of the light-on black reference data, the light-off black reference data, the light-on gray reference data, and the light-off gray reference data are obtained by the image processing section 21 that receives output from the AFE 20.

The control section 10 subtracts, for each pixel position X, the light-off black reference data from the light-on black reference data. The solid line indicating the luminance at each pixel position X in FIG. 4A is read data generated in such a way by subtracting the light-off black reference data from the light-on black reference data (hereinafter, this read data being referred to as black reference data). The black reference data generated in step S240 corresponds to a specific example of "third read data". The control section 10 also subtracts, for each pixel position X, the light-off gray reference data from the light-on gray reference data. The solid line indicating the luminance at each pixel position X in FIG. 4B is read data generated in such a way by subtracting the light-off gray reference data from the light-on gray reference data (hereinafter, this read data being referred to as gray reference data). The gray reference data generated in step S240 corresponds to a specific example of "fourth read data".

Figure 5A:
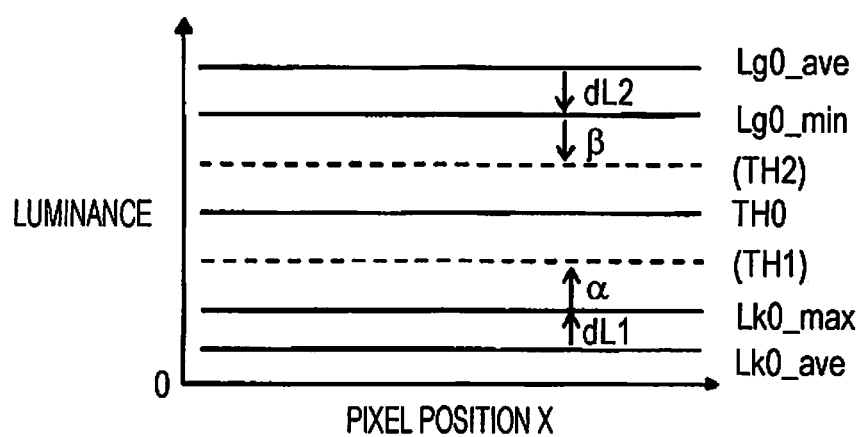
FIG. 5A is a diagram illustrating a method for calculating a threshold common to all pixel positions.

FIG. 5A is a diagram illustrating a method for calculating a threshold. In FIG. 5A, the solid line denoted by reference character Lk0_ave is an average value of black reference data (average black reference data Lk0_ave). In FIG. 5A, the solid line denoted by reference character Lg0_ave is an average value of gray reference data (average gray reference data Lg0_ave). The control section 10 calculates an upper limit value Lk0_max of black reference data by adding a given first offset value dL1 to the average black reference data Lk0_ave. The first offset value dL1 is, for example, an offset value determined in consideration of variations in the output of the image sensor 34 due to temperature effects, variations in the background color (black) of the first background, variations in the output of the image sensor 34 due to natural light effects, and the like. The upper limit value Lk0_max of black reference data corresponds to third read data after offset addition.

The control section 10 also calculates a lower limit value Lg0_min of gray reference data by subtracting a given second offset value dL2 from the average gray reference data Lg0_ave. The second offset value dL2 is, for example, an offset value determined in consideration of age deterioration, a decrease in the amount of light due to temperature effects, and so on of the light source 32. The lower limit value Lg0_min of the gray reference data corresponds to fourth read data after offset subtraction.

The control section 10 further calculates, as a threshold TH0, the average of the upper limit value Lk0_max of black reference data and the lower limit value Lg0_min of gray reference data. As seen from FIG. 5A, the threshold TH0 is a threshold common to all the pixel positions X.

In step S250, the control section 10 causes the threshold calculated in step S240 to be stored in a given memory, for example, the storage section 22 or a memory in the control section 10 other than the storage section 22.

Thus, the threshold setting process is complete. In this way, the image reading apparatus 100 performs the threshold setting process, so that the bodies of the image reading apparatuses 100 distributed on the market have their respective unique thresholds.

The control section 10 calculates a threshold common to all the pixel positions X as illustrated in the example of FIG. 5A and therefore may reduce the consumption of memory for storing thresholds. However, in step S240, the control section 10 may calculate a respective threshold at each pixel position X.

Figure 5B:
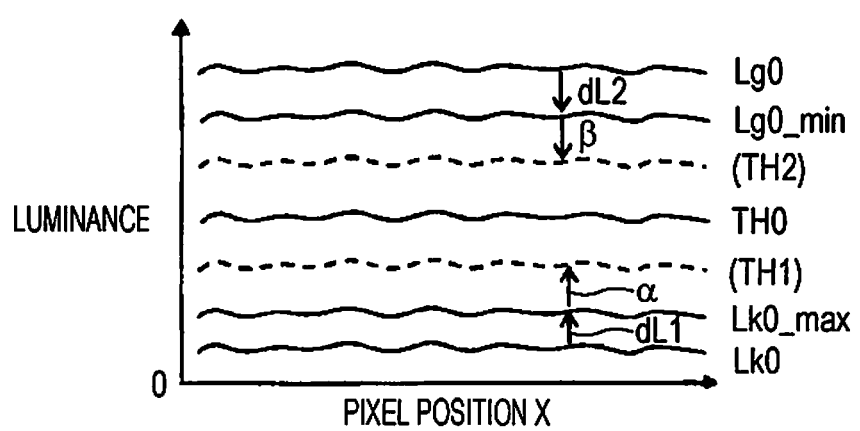
FIG. 5B is a diagram illustrating a method for calculating a respective threshold at each pixel position.

FIG. 5B is a diagram illustrating a method for calculating a respective threshold at each pixel position X in step S240. In FIG. 5B, the solid line denoted by reference character Lk0 is black reference data (black reference data Lk0). In FIG. 5B, the solid line denoted by reference character Lg0 is gray reference data (gray reference data Lg0). The control section 10 calculates, for each pixel position X, the upper limit value Lk0_max of black reference data by adding, for each pixel position X, the first offset value dL1 to the black reference data Lk0.

The control section 10 also calculates, for each pixel position X, the lower limit value Lg0_min of gray reference data by subtracting, for each pixel position X, the second offset value dL2 from the gray reference data Lg0. The control section 10 then calculates, for each pixel position X, the threshold TH0, which is the average of the upper limit value Lk0_max of black reference data and the lower limit value Lg0_min of gray reference data. As in the example of FIG. 5B, in the configuration for calculating a respective threshold at each pixel position X, the control section 10 may set the first offset value dL1 and the second offset value dL2 to values varying at each pixel position X. For example, the second offset value dL2 may be a value varying at each pixel position X, for example, in accordance with variations in the amount of light at each pixel position X in accordance with the characteristics of a lens included in the image sensor 34.

3. Dirt Detection Process

Next, a dirt detection process will be described. As a precondition for performing the dirt detection process, it is assumed that the image reading apparatus 100 has already stored a threshold calculated by the threshold setting process. The term "dirt" as used in the present embodiment refers to dirt on the transparent member 52 caused by a piece of paper, paper dust, dust, and other debris and attached substances.

Figure 6:
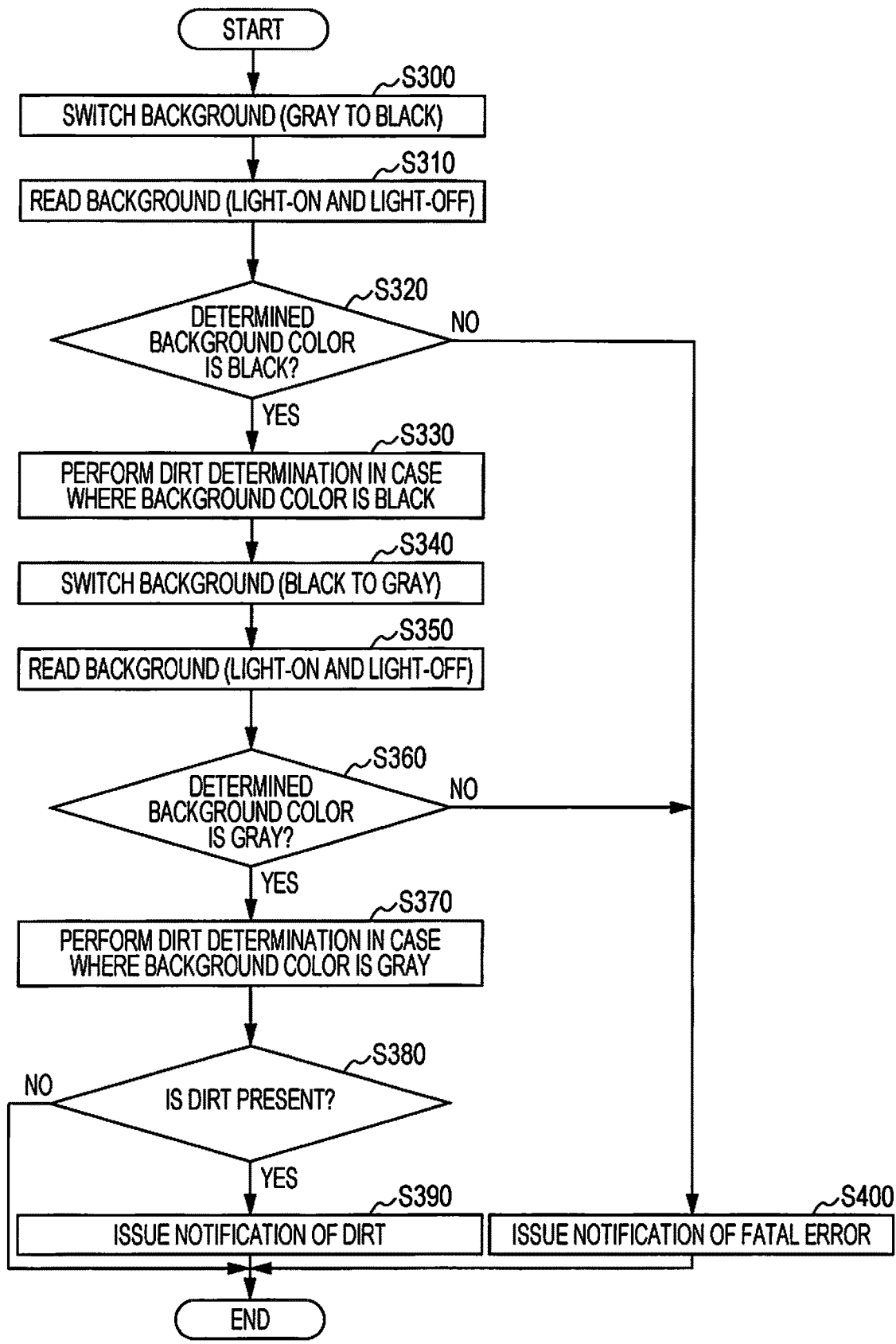
FIG. 6 is a flowchart illustrating a dirt detection process.

FIG. 6 illustrates, in a flowchart, a dirt detection process that is performed by the control section 10. The flowchart in FIG. 6 illustrates the dirt detection process.

The control section 10 begins to perform the dirt detection process, for example, when it is detected that the lid 40 is opened and closed. This is because when a user opens and then closes the lid 40, there is a possibility that the transparent member 52 would become dirty between such opening and closing operations. The way by which the control section 10 detects opening and closing of the lid 40 may be any way such as using a sensor, and a known method may be employed.

In step S300, the control section 10 switches the background facing the transparent member 52 from the second background to the first background. That is, the background color of the transparent member 52 is switched from gray to black. In step S300, the same process as in step S200 is performed.

In step S310, the control section 10 performs light-on reading of a background and light-off reading of the background by controlling the light source 32 and the reading section 31. In step S310, the same process as in step S210 is performed.

In step S320, the dirt detection section 15 of the control section 10 determines whether the background color is the first color, that is, black. In step S320, if the dirt detection section 15 determines that the background color is black, the process proceeds to step S330, whereas if the dirt detection section 15 determines that the background color is not black, the process proceeds to step S400.

The determination method in step S320 will be described.

Read data obtained in step S310 by causing the reading section 31 to read the first background in the state where the light source 32 is turned on is referred to as light-on black read data. Read data obtained in step S310 by causing the reading section 31 to read the first background in the state where the light source 32 is turned off is referred to as light-off black read data. Both the light-on black read data and the light-off black read data are obtained by the image processing section 21 that receives output from the AFE 20. The dirt detection section 15 subtracts, for each pixel position X, the light-off black read data from the light-on black read data. The read data generated in such a way by subtracting the light-off black read data from the light-on black read data (hereinafter this read data being referred to as black read data) corresponds to a specific example of "first read data".

The timing at which the threshold setting process is performed differs from the timing at which the dirt detection process is performed. Therefore, in reality, it is difficult to consider that "light-on black reference data", "light-off black reference data" and "black reference data" perfectly match "light-on black read data", "light-off black read data" and "black read data", respectively. However, it may be safely interpreted that the relationship among "light-on black read data", "light-off black read data", and "black read data" is approximately the same as the relationship among "light-on black reference data", "light-off black reference data", and "black reference data" as illustrated in FIG. 4A.

The dirt detection section 15 compares black read data at each pixel position X with the stored threshold TH0. At this point, not black read data at all the pixel positions X but black read data of some of the pixels may be compared with the threshold TH0. The dirt detection section 15 extracts, for example, among black read data at each pixel position X, M pieces of black read data at intervals of a given number of pixels. If, among the M pieces of extracted black read data, a given number (N) or more of pieces of black read data are below the threshold TH0, the dirt detection section 15 determines that the background color is black, and the process proceeds to step S330. However, M is greater than N. In contrast, if, among M pieces of extracted black read data, the number of pieces of black read data below the threshold TH0 is less than N, the dirt detection section 15 determines that the background color is not black, that is, determines that it is unable to be verified that the background color is black, and the process proceeds to step S400.

In step S330, the dirt detection section 15 performs a dirt determination in accordance with the situation where the background is black. That is, the dirt detection section 15 compares the black read data at each pixel position X with the threshold TH0. If the black read data is above the threshold TH0, the dirt detection section 15 determines that dirt is present.

Next, in step S340, the control section 10 switches the background facing the transparent member 52 from the first background to the second background. That is, the background color of the transparent member 52 is switched from black to gray. In step S340, the same process as in step S220 is performed.

In step S350, the control section 10 performs light-on reading of the background and light-off reading of the background by controlling the light source 32 and the reading section 31. In step S350, the same process as in step S230 is performed.

In step S360, the dirt detection section 15 of the control section 10 determines whether the background color is the second color, that is, gray. In step S360, if the dirt detection section 15 determines that the background color is gray, the process proceeds to step S370, and if the dirt detection section 15 determines that the background color is not gray, the process proceeds to step S400.

The determination method in step S360 will be described.

Read data obtained by causing the reading section 31 to read the second background in the state where, in step S350, the light source 32 is turned on is referred to as light-on gray read data. Read data obtained by causing the reading section 31 to read the second background in the state where, in step S350, the light source 32 is turned off is referred to as light-off gray read data. Both the light-on gray read data and the light-off gray read data are obtained by the image processing section 21 that receives output from the AFE 20. The dirt detection section 15 subtracts, for each pixel position X, the light-off read data from the light-on read data. Read data generated in such a way by subtracting the light-off gray read data from the light-on gray read data (hereinafter, this read data being referred to as gray read data) corresponds to a specific example of "second read data".

The timing at which the threshold setting process is performed differs from the timing at which the dirt detecting process is performed. Therefore, in reality, it is difficult to consider that "light-on gray reference data", "light-off gray reference data" and "gray reference data" perfectly match "light-on gray reading data", "light-off gray reading data", and "gray reading data", respectively. However, it may be safely interpreted that the relationship among "light-on gray reading data", "lighting-off gray reading data", and "gray reading data" is approximately the same as the relationship among "light-on gray reference data", "light-off gray reference data" and "gray reference data" illustrated in FIG. 4B.

The dirt detection section 15 compares gray read data at each pixel position X with the stored threshold TH0. At this point, not gray read data at all the pixel positions X but gray read data of some of the pixels may be compared with the threshold TH0. The dirt detection section 15 extracts, for example, among gray read data at each pixel position X, M pieces of gray read data at intervals of a given number of pixels. If, among the M pieces of extracted gray read data, a given number (N) or more of pieces of gray read data are above the threshold TH0, the dirt detection section 15 determines that the background color is gray, and the process proceeds to step S370. In contrast, if, among the M pieces of extracted gray read data, the number of pieces of gray read data above the threshold TH0 is less than N, the dirt detection section 15 determines that the background color is not gray, that is, determines that it is unable to be verified that the background color is gray, and the process proceeds to step S400.

In step S370, the dirt detection section 15 performs a dirt determination in accordance with the situation where the background color is gray. That is, the dirt detection section 15 compares the gray read data at each pixel position X with the threshold TH0. If the gray read data is below the threshold TH0, the dirt detection section 15 determines that dirt is present.

Figure 7:
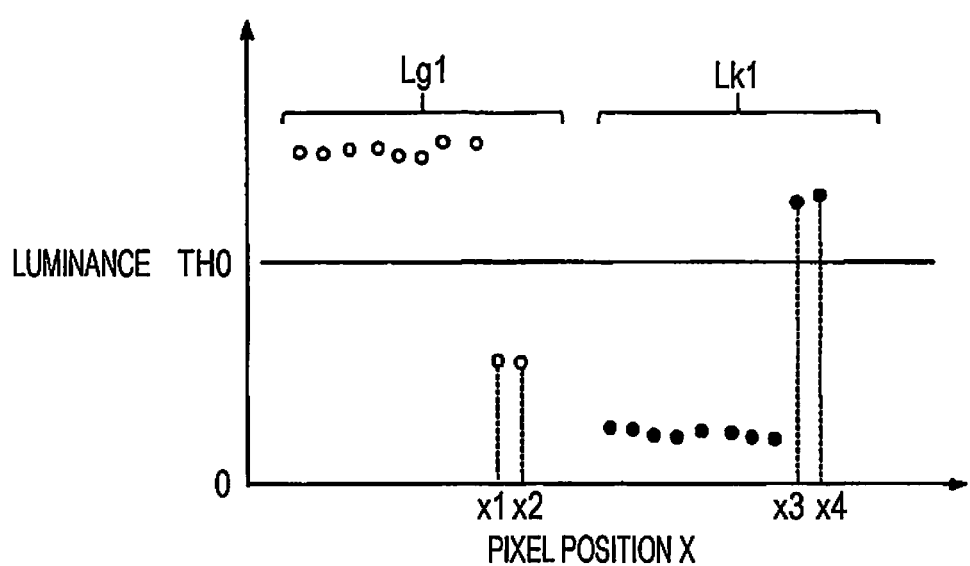
FIG. 7 is a diagram illustrating dirt determinations.

FIG. 7 is a diagram illustrating a dirt determination in step S330 and a dirt determination in step S370. In FIG. 7, some pieces of black read data Lk1 at each pixel position X to be compared with the threshold TH0 in step S330 are indicated by black circles. In FIG. 7, some pieces of gray read data Lg1 at each pixel position X to be compared with the threshold TH0 in step S370 are indicated by white circles. If there are, of the black read data Lk1, one or more pieces of black read data Lk1 above the threshold TH0 as indicated at the pixel positions X=x3 and x4, the dirt detection section 15 determines in step S330 that dirt is present. In addition, if there are, of the gray read data Lg1, one or more pieces of gray read data Lg1 below the threshold TH0 as indicated at the pixel positions X=x1 and x2, the dirt detection section 15 determines in step S370 that dirt is present.

In step S380, the dirt detection section 15 branches the process depending on determination results in steps S330 and S370. That is, in the case where the dirt detection section 15 has determined in at least one of steps S330 and S370 that dirt is present, the dirt detection section 15 determines that dirt is present, that is, "Yes" and the process proceeds to step S390. The determination result of "Yes" in step S380 means that dirt is detected. In contrast, in the case where, in both of steps S330 and S370, the dirt detection section 15 has not determined that dirt is present, the dirt detection section 15 determines that dirt is absent, that is, "No" and the dirt detection process ends.

In step S390, the dirt detection section 15 notifies the outside that dirt is present, and then the dirt detection process ends. In this case, the dirt detection section 15 causes the display section of the operation panel 33 to display warning that dirt is present on the transparent member 52. The dirt detection section 15 may transmit, via the output section 23 to an external host and the like, a notification that dirt is present on the transparent member 52. As a result of step S390, the user who has recognized that dirt is present on the transparent member 52 is able to clean the transparent member 52 to remove dirt on the transparent member 52.

In step S400, the dirt detection section 15 notifies the outside of an important error, that is, that there is a fatal error, and then the dirt detection process ends. In this case, the dirt detection section 15 causes the display section of the operation panel 33 to display the fatal error. The dirt detection section 15 may transmit, via the output section 23 to an external host and the like, a notification that there is a fatal error. The fatal error as used here refers to the state where background switching does not normally operate, and specifically a failure of the motor 44, a failure of a mechanism that transfers the motive power of the motor 44 to the background plate 43, and the like are assumed.

The threshold TH0 that is used for determinations in steps S320, S330, S360, and S370 has a value common to all the pixel positions X as described with reference to FIG. 5A or has a value varying at each pixel position X as described with reference to FIG. 5B. In the case where the stored threshold TH0 is a respective value at each pixel position X, in steps S320, S330, S360, and S370, of course, the dirt detection section 15 compares black read data or gray read data with the threshold TH0 to which the pixel position X corresponds.

4. Conclusion

According to the present embodiment as described above, the image reading apparatus 100 includes the reading section 31 that receives light input via the transparent member 52 to perform reading, the background section configured to switch a background facing the transparent member 52 either to a first background, which is a background of a first color, or to a second background, which is a background of a second color brighter than the first color, and the control section 10. Further, the control section 10 compares, with a threshold set in advance, first read data generated by causing the reading section 31 to perform reading of the first background. The control section 10 also compares, with the threshold, second read data generated by causing the reading section 31 to perform reading of the second background. Further, when the first read data is above the threshold or when the second read data is below the threshold, the control section 10 determines that dirt is present on the transparent member 52. That is, in step S380, the determination result is "Yes".

According to the above configuration, the image reading apparatus 100 performs both the comparison of the first read data with a threshold and the comparison of the second read data with the threshold. Thus, for dirt with such a density that it has not been able to be determined that dirt is present, it may be determined that dirt is present. Specifically, only by the determination based on read data obtained by reading the first background of the first color, relatively dark dirt indicated by the read values (luminance) as corresponding to the pixel positions x1 and x2 in FIG. 7 has been highly unlikely to be detected as dirt. In addition, only by the determination based on read data obtained by reading the second background of the second color, relatively bright dirt indicated by the read values (luminance) as corresponding to the pixel positions x3 and x4 in FIG. 7 has been highly unlikely to be detected as dirt. However, in the present embodiment, both the determination based on the first read data and the determination based on the second read data are performed, and thus, for dirt with any density, it may be determined that dirt is present.

In addition, according to the present embodiment, the threshold is a value set based on the third read data after offset addition, which is data obtained by adding the given first offset value dL1 to the third read data generated by causing the reading section 31 to perform reading of the first background, and based on the fourth read data after offset subtraction, which is data obtained by subtracting the given second offset value dL2 from the fourth read data generated by causing the reading section 31 to read the second background.

According to the above configuration, a suitable threshold in which variations in the first read data and the second read data observed during the dirt detection process due to various factors including the environment, such as temperature and natural light, and aging degradation are taken into consideration in advance may be obtained for a dirt determination.

In addition, according to the present embodiment, the threshold is the average of the third read data after offset addition and the fourth read data after offset subtraction.

According to the above configuration, a threshold for comparison with the first read data and a threshold for comparison with the second read data may be unified into the threshold TH0, which facilitates the threshold setting process and the dirt detection process.

However, the threshold for comparison with the first read data and the threshold for comparison with the second read data may be different. That is, the threshold mentioned above may include a first threshold set based on the third read data after offset addition and a second threshold set based on the fourth read data after offset subtraction.

Description will be given with reference to FIG. 5A and FIG. 5B. In step S240, as illustrated in FIG. 5A, the control section 10 may calculate a threshold TH1 by adding a given margin α to the upper limit value Lk0_max of black reference data. As illustrated in FIG. 5A, the control section 10 may also calculate a threshold TH2 by subtracting a given margin β from the lower limit value Lg0_min of gray reference data.

Alternatively, in step S240, as illustrated in FIG. 5B, the control section 10 may calculate the respective threshold TH1 at each pixel position X, by adding, for each pixel position X, the given margin α to the upper limit value Lk0_max of black reference data. As illustrated in FIG. 5B, the control section 10 may also calculate the respective threshold TH2 at each pixel position X by subtracting, for each pixel position X, the given margin β from the lower limit value Lg0_min of gray reference data.

The threshold TH1 is an example of the first threshold and the threshold TH2 is an example of the second threshold. The control section 10 that has calculated the thresholds TH1 and TH2 in step S240 stores the thresholds TH1 and TH2 in step S250. In the case where the first threshold and the second threshold in such a manner are thresholds set in advance, in the dirt detection process, if the first read data is above the first threshold or if the second read data is below the second threshold, the control section 10 determines that dirt is present on the transparent member 52. That is, in step S330, black read data is compared with the first threshold. In addition, in step S370, gray read data is compared with the second threshold. According to such a configuration, a threshold for comparison with the first read data and a threshold for comparison with the second read data may be individually optimized. In the case where the first threshold and the second threshold are thresholds set in advance, the first threshold is also used for a determination in step S320 and the second threshold is also used for a determination in step S360.

In addition, according to the present embodiment, the image reading apparatus 100 includes a cover (the lid 40) that covers the given surface 51 including the transparent member 52 and that is openable and closable. When the cover is opened or closed, the control section 10 determines, in accordance with comparison between the first read data and the threshold and comparison between the second read data and the threshold, whether dirt is present on the transparent member 52.

According to the above configuration, the dirt detection process may be performed after occurrence of a situation where dirt is likely to be produced on the transparent member 52, and the produced dirt may be rapidly detected.

However, the condition for beginning the dirt detection process is not limited to detection of opening or closing of the lid 40. For example, the control section 10 may begin the dirt detection process at the timing when reading of an original transported by the transport section 30 has been completed, that is, transportation of an original reading of which is complete has been completed by the transport section 30. After completion of reading of the original, paper dust and the like of the original are likely to be adhered onto the transparent member 52, and therefore completion of reading of the original may be considered to be suitable as one timing at which the dirt detection process is to begin.

Although it is also a condition that the threshold has been stored by the threshold setting process, the control section 10 may begin the dirt detection process at the timing at which the power button of the image reading apparatus 100 is pressed to activate the image reading apparatus 100.

In addition, according to the present embodiment, the control section 10 instructs the background section to perform switching to the first background and compares, with the threshold, the first read data generated by reading performed by the reading section 31 after the instruction for switching to the first background. If, among pixels constituting the first read data, a given number or more of pixels have values below the threshold, it is determined, in accordance with comparison between the first read data and the threshold, whether dirt is present on the transparent member 52. The control section 10 also instructs the background section to perform switching to the second background and compares, with the threshold, the second read data generated by reading performed by the reading section 31 after the instruction for switching to the second background. If, among pixels constituting the second read data, a given number or more of pixels have values above the threshold, it is determined, in accordance with comparison between the second read data and the threshold, whether dirt is present on the transparent member 52.

According to the above configuration, after verifying that background switching that the background section was instructed to perform has been properly performed, the control section 10 performs a dirt determination. Thus, the reliability of a dirt determination result improves. The threshold mentioned above may be commonly used for verifying that background switching that the background section was instructed to perform has been properly performed (step S320 and step S360) and for performing dirt determinations (step S330 and step S370).

However, in the present embodiment, the determination in step S320 and the determination in step S360 are inessential. That is, in the dirt detection process in FIG. 6, step S330 may be performed following step S310, and step S370 may be performed following step S350. In a configuration in which steps S320 and S360 are skipped, the control section 10 calculates black read data in step S330 and calculates gray read data in step S370.

In addition, when the control section 10 begins the dirt detection process in response to completion of reading of an original as described above, the process may skip steps S320 and S360 in the procedure of the dirt detection process. Completion of reading of an original means that the image reading apparatus 100 has operated properly. In such a situation, it is less desired to verify whether switching of the background performed by the background section is properly performed.

In addition, according to the present embodiment, a dirt detection method is disclosed that includes a first reading step of generating first read data by reading the first background of the first color, the first background being a background facing the transparent member 52, by the reading section 31 that receives light input via the transparent member 52 to perform reading; a first comparison step of comparing the first read data with the threshold set in advance; a second reading step of generating second read data by causing the reading section 31 to read the second background of the second color brighter than the first color, the second background being a background facing the transparent member 52; a second comparison step of comparing the second read data with the threshold; and a determination step of determining, when the first read data is above the threshold or when the second read data is below the threshold, that dirt is present on the transparent member 52.

5. Other Embodiments

Other implementations included in the present embodiment will be described.

In step S330, the dirt detection section 15 may determine that dirt is present when black read data is above the threshold at a certain number or more of successive pixel positions X. Similarly, in step S370, the dirt detection section 15 may determine that dirt is present when gray read data is below the threshold at a certain number or more of successive pixel positions X. Thus, for noise of the first read data and the second read data that does not correspond to actual dirt, the dirt detection section 15 may avoid determining that dirt is present.

In the example of FIG. 2, by changing the position of the background plate 43 of the second color, the background section switches the background facing the transparent member 52 either to the first background of the first color or to the second background of the second color. However, the background section may have a configuration in which a background plate of the first color and a background plate of the second color are included and one of the background plate of the first color and the background plate of the second color is selectively moved to a position facing the transparent member 52.

The threshold TH0 and the thresholds TH1 and TH2 may be set to values common to a plurality of image reading apparatuses 100. That is, when the threshold setting process is performed before the image reading apparatus 100 is shipped to the market, a threshold calculated by the threshold setting process performed by some image reading apparatus 100 may be stored as a threshold common to the plurality of image reading apparatuses 100.

The image reading apparatus 100 may be a scanner capable of simultaneously reading one surface and the other surface of an original. That is, there is assumed a configuration that includes a transparent member, a light source, and a reading section disposed for reading one surface of an original, a transparent member, a light source, and a reading section disposed for reading the other surface of the original, a background section that switches a background facing the transparent member disposed for reading one surface of the original across a transport path of the original to a first background or a second background, a background section that switches a background facing the transparent member disposed for reading the other surface of the original across the transport path of the original to the first background or the second background. The present embodiment may be applied to the dirt detection process in each of the two transparent members.

In the image reading apparatus 100, for calibration of an LED of the light source 32, gain adjustment of the AFE 20, and the like that are usually performed in the reading process, the processing time required for these calibration, gain adjustment, and the like may be substantially saved by using adjustment values stored together with the thresholds in a memory. That is, the image reading apparatus 100 performs calibration, gain adjustment, and the like as an initial process prior to beginning of the threshold setting process and causes the obtained lighting time of the LED and gain adjustment values to be stored together with the thresholds in a memory at the time of completion of the threshold setting process. At the beginning of the dirt detection process, the image reading apparatus 100 uses the stored adjustment values to adjust the lighting time of the LED and the gains and therefore may reduce the processing burden.

Next, a second embodiment will be described.

The embodiment that has been described is referred to as a first embodiment. For the second embodiment, differences from the first embodiment will be described. In dirt determinations in steps S330 and S370 in the first embodiment, the dirt detection section 15 compares black read data and gray read data with the stored threshold. In contrast, in dirt determinations in step S330 and S370 in the second embodiment, the dirt detection section 15 evaluates each of a difference between the black reference data and the black read data and a difference between the gray reference data and the gray read data. In the second embodiment, at the timing of step S250, the image reading apparatus 100 is to store black reference data and gray reference data calculated in the course of the threshold setting process.

Figure 8:
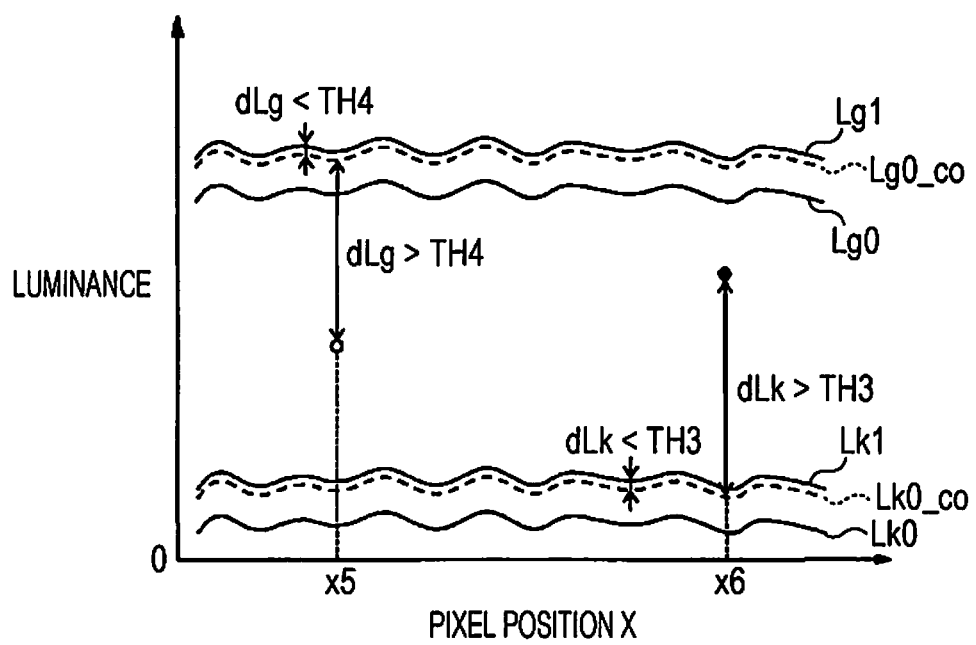
FIG. 8 is a diagram illustrating dirt determinations in an embodiment.

FIG. 8 is a diagram illustrating a dirt determination in step S330 and a dirt determination in step S370 in the second embodiment. In FIG. 8, the black reference data Lk0, the black read data Lk1, and post-correction black reference data Lk0_co are illustrated. In addition, in FIG. 8, the gray reference data Lg0, the gray read data Lg1, and post-correction gray reference data Lg0_co are illustrated.

In step S330, the dirt detection section 15 calculates, as a third offset value, a difference between the average value of the black reference data Lk0 and the average value of the black read data Lk1. Next, the dirt detection section 15 adds, for each pixel position X, the third offset value to, of the black reference data Lk0 and the black read data Lk1, data of a lower average value. With reference to the example of FIG. 8, the average value of the black reference data Lk0 is smaller than the average value of the black read data Lk1, and therefore the third offset value is added to the black reference data Lk0 at each pixel position X. Such data obtained after the third offset value has been added to the black reference data Lk0 is the post-correction black reference data Lk0_co.

The dirt detection section 15 compares, for each pixel position X, a difference dLk between the black read data Lk1 and the post-correction black reference data Lk0_co with a given threshold TH3. If the difference dLk is above the threshold TH3, the dirt detection section 15 determines that dirt is present. The black read data Lk1 and the post-correction black reference data Lk0_co have a relationship in which differences in various conditions, for example, differences in various factors, such as the environment including temperature, natural light, and so on and aging degradation, between the threshold setting process and the dirt detection process are substantially cancelled out. Therefore, evaluating the difference dLk between the black read data Lk1 and the post-correction black reference data Lk0_co makes it possible to properly evaluate whether there is an abnormality, that is, whether dirt is present, in the black read data Lk1, which is read data of the first background.

The threshold TH3 corresponds to an example of a third threshold. A given threshold TH4 described later corresponds to an example of a fourth threshold. The thresholds TH3 and TH4 are thresholds that are optimized for respective dirt determinations in steps S330 and S370 in the second embodiment and that are stored in advance or are produced by the dirt detection section 15. In FIG. 8, the black circle indicates the black read data Lk1 at the pixel position X=x6.

If, as indicated at the pixel position X=x6, there is the black read data Lk1 whose difference dLk is above the threshold TH3, in step S330, the dirt detection section 15 determines that dirt is present.

In step S370, the dirt detection section 15 calculates, as a fourth offset value, the difference between the average value of the gray reference data Lg0 and the average value of the gray read data Lg1. Next, for each pixel position X, the dirt detection section 15 adds the fourth offset value to, of the gray reference data Lg0 and the gray read data Lg1, data of a lower average value. With reference to the example of FIG. 8, the average value of the gray reference data Lg0 is smaller than the average value of the gray read data Lg1, and therefore the fourth offset value is added to the gray reference data Lg0 at each pixel position X. Such data obtained after the fourth offset value has been added to the gray reference data Lg0 is the post-correction gray reference data Lg0_co.

The dirt detection section 15 compares, for each pixel position X, the difference dLg between the gray read data Lg1 and the post-correction gray reference data Lg0_co with the threshold TH4. If the difference dLg is above the threshold TH4, the dirt determination section 15 determines that dirt is present. The gray read data Lg1 and the post-correction gray reference data Lg0_co have a relationship in which differences in various conditions, for example, differences in various factors, such as the environment including temperature, natural light, and so on and aging degradation, between the threshold setting process and the dirt detection process are substantially cancelled out. Therefore, evaluating the difference dLg between the gray read data Lg1 and the post-correction gray reference data Lg0_co makes it possible to properly evaluate whether there is an abnormality, that is, whether dirt is present, in the gray read data Lg1, which is read data of the second background. In FIG. 8, the white circle indicates the gray read data Lg1 at the pixel position X=x5. If, as indicated at the pixel position X=x5, there is the gray read data Lg1 whose difference dLg is above the threshold TH4, in step S370, the dirt detection section 15 determines that dirt is present.

However, in step S330, the dirt detection section 15 may compare, for each pixel position X, a difference between the black read data Lk1 and the black reference data Lk0 with the third threshold. However, the third threshold in this case is set to some value that is obtained by adding the third offset value to the threshold TH3. In addition, in step S370, the dirt detection section 15 may compare, for each pixel position X, the difference between the gray read data Lg1 and the gray reference data Lg0 with the fourth threshold. However, the fourth threshold in this case is set to some value that is obtained by adding the fourth offset value to the threshold TH4.

According to the second embodiment as described above, the control section 10 compares the first read data generated by causing the reading section 31 to read the first background with the third read data generated in advance by reading of the first background performed by the reading section 31. The control section 10 also compares the second read data generated by causing the reading section 31 to read the second background with the fourth read data generated in advance by reading of the second background performed by the reading section 31. Then, when the difference between the first read data and the third read data is above the given third threshold or when the difference between the second read data and the fourth read data is above the given fourth threshold, the control section 10 determines that dirt is present on the transparent member 52. That is, in step S380, the determination result is "Yes".

According to the above configuration, the image reading apparatus 100 performs both evaluation of a difference between the first read data and the third read data and evaluation of a difference between the second read data and the fourth read data. Relatively dark dirt indicated by the read value (luminance), which is unlikely to be determined as dirt by a comparison of the difference between the first read data and the third read data with the third threshold, may be determined as dirt by a comparison of the difference between the second read data and the fourth read data with the fourth threshold. In contrast, relatively light dirt indicated by the read value (luminance), which is unlikely to be determined as dirt by a comparison of the difference between the second read data and the fourth read data with the fourth threshold, may be determined as dirt by a comparison of the difference between the first read data and the third read data with the third threshold. That is, according to the present embodiment, for dirt of any density, it may be determined that dirt is present.

In the above, the black read data has been assumed as the first read data, the gray read data has been assumed as the second read data, the black reference data has been assumed as the third read data, and the gray reference data has been assumed as the fourth read data. However, more simply, light-on black read data may be assumed as the first read data, the light-on gray read data may be assumed as the second read data, light-on black reference data may be assumed as the third read data, and the light-on gray reference data may be assumed as the fourth read data.

What is claimed is:

1. An image reading apparatus comprising:
a reading section that receives light input via a transparent member to perform reading of an image of a document that is disposed facing the transparent member; and
a processor configured to switch a background facing the transparent member either to a first background that is a background of a first color or to a second background that is a background of a second color brighter than the first color, wherein
the processor
causes the reading section to perform reading the first background to generate first read data while the first background is facing the transparent member and a document is not disposed facing the transparent member,
causes the reading section to perform reading the second background to generate second read data while the second background is facing the transparent member and a document is not disposed facing the transparent member,
compares the first read data with a threshold set in advance,
compares the second read data with the threshold, and
when the first read data is above the threshold or when the second read data is below the threshold, determines that dirt is present on the transparent member.

2. An image reading apparatus comprising:
a reading section that receives light input via a transparent member to perform reading; and
a processor configured to switch a background facing the transparent member either to a first background that is a background of a first color or to a second background that is a background of a second color brighter than the first color, wherein the processor compares, with a threshold set in advance, first read data generated by causing the reading section to perform reading of the first background, compares, with the threshold, second read data generated by causing the reading section to perform reading of the second background, and, when the first read data is above the threshold or when the second read data is below the threshold, determines that dirt is present on the transparent member, and wherein the threshold is a value that is set based on third read data after offset addition, the third read data after offset addition being data obtained by adding a given first offset value to third read data generated by causing the reading section to perform reading of the first background, and based on fourth read data after offset subtraction, the fourth read after offset subtraction being data obtained by subtracting a given second offset value from the fourth read data generated by causing the reading section to perform reading of the second background.

3. The image reading apparatus according to claim 2, wherein the threshold is an average of the third read data after offset addition and the fourth read data after offset subtraction.

4. The image reading apparatus according to claim 2, wherein the threshold includes a first threshold that is set based on the third read data after offset addition and a second threshold that is set based on the fourth read data after offset subtraction, and wherein when the first read data is above the first threshold or when the second read data is below the second threshold, the processor determines that dirt is present on the transparent member.

5. An image reading apparatus comprising:

a reading section that receives light input via a transparent member to perform reading;

a processor configured to switch a background facing the transparent member either to a first background that is a background of a first color or to a second background that is a background of a second color brighter than the first color; and a cover that covers a given surface including the transparent member, the cover being configured to be opened or closed, wherein the processor compares, with a threshold set in advance, first read data generated by causing the reading section to perform reading of the first background, compares, with the threshold, second read data generated by causing the reading section to perform reading of the second background, and, when the first read data is above the threshold or when the second read data is below the threshold, determines that dirt is present on the transparent member, and wherein when the cover is opened or closed, the processor determines, in accordance with a comparison between the first read data and the threshold and a comparison between the second read data and the threshold, whether dirt is present on the transparent member.

6. The image reading apparatus according to claim 1, wherein the processor performs switching to the first background, compares, with the threshold, the first read data generated by reading performed by the reading section after the switching to the first background, and, when, among pixels constituting the first read data, a given number or more of pixels have values below the threshold, determines, in accordance with the comparison between the first read data and the threshold, whether dirt is present on the transparent member, and wherein the processor performs switching to the second background, compares, with the threshold, the second read data generated by reading performed by the reading section after the switching to the second background, and, when, among pixels constituting the second read data, a given number or more of pixels have values above the threshold, determines, in accordance with the comparison between the second read data and the threshold, whether dirt is present on the transparent member.

7. A dirt detection method comprising:

generating first read data by reading a first background of a first color while the first background is facing a transparent member and a document is not disposed facing the transparent member, by a reading section, the reading section being configured to receive light input via the transparent member to perform reading of an image of a document that is disposed facing the transparent member;

comparing the first read data with a threshold set in advance;

generating second read data by reading, by the reading section, a second background of a second color brighter than the first color while the second background is facing the transparent member and a document is not disposed facing the transparent member;

comparing the second read data with the threshold; and determining, when the first read data is above the threshold or when the second read data is below the threshold, that dirt is present on the transparent member.

8. An image reading apparatus comprising:

a reading section that receives light input via a transparent member to perform reading;

a processor configured to switch a background facing the transparent member either to a first background that is a background of a first color or to a second background that is a background of a second color brighter than the first color, wherein the processor compares first read data generated by causing the reading section to perform reading of the first background with third read data generated in advance by reading of the first background performed by the reading section, compares second read data generated by causing the reading section to perform reading of the second background with fourth read data generated by reading of the second background performed by the reading section, and, when a difference between the first read data and the third read data is above a given third threshold or when a difference between the second read data and the fourth read data is above a given fourth threshold, determines that dirt is present on the transparent member.

* * * * *